United States Patent
Eisen et al.

(10) Patent No.: US 9,996,354 B2
(45) Date of Patent: Jun. 12, 2018

(54) INSTRUCTION STREAM TRACING OF MULTI-THREADED PROCESSORS

(71) Applicant: International Business Machines Corporation, Armonk, NY (US)

(72) Inventors: Lee E. Eisen, Round Rock, TX (US); Lisa C. Heller, Rhinebeck, NY (US); Michael T. Huffer, Walden, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/592,936

(22) Filed: Jan. 9, 2015

(65) Prior Publication Data

US 2016/0203073 A1    Jul. 14, 2016

(51) Int. Cl.
*G06F 9/44* (2006.01)
*G06F 9/45* (2006.01)
(Continued)

(52) U.S. Cl.
CPC ...... *G06F 9/30141* (2013.01); *G06F 11/1405* (2013.01); *G06F 11/3447* (2013.01);
(Continued)

(58) Field of Classification Search
CPC .. G06F 9/5066; G06F 9/30058; G06F 9/4881; G06F 9/3802; G06F 9/5027; G06F 9/4887; G06F 9/4843; G06F 9/5044; G06F 9/3851; G06F 9/3885; G06F 9/3861; G06F 9/30127; G06F 8/41; G06F 8/456;
(Continued)

(56) References Cited

U.S. PATENT DOCUMENTS 5,168,554 A * 12/1992 Luke ............... G06F 11/323
                                               714/E11.181
5,715,435 A *  2/1998 Ikei ............... G06F 11/3636
                                                         703/23
(Continued)

OTHER PUBLICATIONS

Andrew Ayers et al., TraceBack: First fault diagnosis by reconstruction of distributed control flow, Jun. 12-15, 2005, [Retrieved on Oct. 27, 2017]. Retrieved from the internet: <URL: http://delivery.acm.org/10.1145/1070000/1065035/p201-ayers.pdf> 12 Pages (201-212).*

(Continued)

*Primary Examiner* — Anibal Rivera
(74) *Attorney, Agent, or Firm* — Steven F. McDaniel

(57) ABSTRACT

A method and apparatus for tracing instruction streams for a multi-threaded processor are disclosed herein. In one embodiment, the apparatus includes a last thread register configured to store a thread index that indicates a last executed thread, a tracing memory configured to store, within each of a plurality of storage locations, state information corresponding to a dispatch cycle for a multi-threaded processor, and a tracing control module configured to provide the state information to the tracing memory. The state information includes instruction information and a previous thread index. The state information may also include a flip bit that is used to determine a current insertion point within the tracing memory. A corresponding method is also disclosed herein.

19 Claims, 5 Drawing Sheets

(51) Int. Cl.
*G06F 11/36* (2006.01)
*G06F 9/46* (2006.01)
*G06F 9/30* (2018.01)
*G06F 11/14* (2006.01)
*G06F 11/34* (2006.01)
*G06F 9/38* (2018.01)
*G06F 9/48* (2006.01)

(52) U.S. Cl.
CPC ...... *G06F 11/3636* (2013.01); *G06F 9/30123* (2013.01); *G06F 9/3851* (2013.01); *G06F 9/4881* (2013.01); *G06F 9/4887* (2013.01); *G06F 11/3612* (2013.01)

(58) Field of Classification Search
CPC ........ G06F 8/4843; G06F 8/445; G06F 8/314; G06F 17/30; G06F 8/45; G06F 11/3612; G06F 11/348; G06F 11/3466; G06F 11/3636; G06F 11/3664; G06F 11/3409; G06F 11/3624; G06F 11/22; G06F 11/3648; G06F 11/323; G06F 11/3447; G06F 11/3656; G06F 9/30141; G06F 11/3404; G06F 11/3471; G06F 12/0875; G06F 12/084; G06F 12/0284; G06F 12/109; G06F 12/0804; G06F 9/3826; G06F 9/3005; G06F 9/3824; G06F 9/30181; G06F 9/3842; G06F 9/3867; G06F 9/3012; G06F 9/3834; G06F 9/3887; G06F 9/3009; G06F 9/3808; G06F 9/3409; G06F 9/3624; G06F 9/4812; G06F 11/1438; G06F 11/1497; G06F 11/1008; G06F 11/1405; G06F 8/70; G06F 8/443
See application file for complete search history.

(56) References Cited

U.S. PATENT DOCUMENTS

| | | | |
|---|---|---|---|
| 5,894,575 A | 4/1999 | Levine et al. | |
| 5,953,530 A * | 9/1999 | Rishi | G06F 11/3636 714/38.13 |
| 6,223,208 B1 * | 4/2001 | Kiefer | G06F 9/3009 712/E9.032 |
| 6,240,509 B1 | 5/2001 | Akkary | |
| 6,247,121 B1 * | 6/2001 | Akkary | G06F 9/3834 712/216 |
| 6,314,530 B1 * | 11/2001 | Mann | G06F 11/348 714/25 |
| 6,321,331 B1 * | 11/2001 | Roy | G06F 11/3636 712/244 |
| 6,353,924 B1 * | 3/2002 | Ayers | G06F 11/3466 714/E11.2 |
| 6,401,155 B1 | 6/2002 | Saville et al. | |
| 6,662,358 B1 * | 12/2003 | Berry | G06F 17/30 714/47.2 |
| 6,772,324 B2 | 8/2004 | Akkary et al. | |
| 7,454,666 B1 * | 11/2008 | Jordan | G06F 11/3636 712/227 |
| 7,739,667 B2 * | 6/2010 | Callahan, II | G06F 11/3404 717/127 |
| 7,805,593 B1 * | 9/2010 | Donlin | G06F 11/3466 712/227 |
| 7,873,817 B1 * | 1/2011 | Aloni | G06F 12/0804 712/215 |
| 8,484,516 B2 * | 7/2013 | Giannini | G06F 11/3636 714/12 |
| 9,021,436 B2 | 4/2015 | Sathya et al. | |
| 2001/0037445 A1 * | 11/2001 | Mukherjee | G06F 11/1405 712/216 |
| 2002/0059544 A1 | 5/2002 | Boucher et al. | |
| 2002/0078122 A1 * | 6/2002 | Joy | G06F 9/3842 718/102 |
| 2002/0138717 A1 * | 9/2002 | Joy | G06F 9/30127 712/235 |
| 2003/0014612 A1 * | 1/2003 | Joy | G06F 9/3824 712/215 |
| 2003/0074650 A1 * | 4/2003 | Akgul | G06F 11/3624 717/129 |
| 2004/0064685 A1 * | 4/2004 | Nguyen | G06F 11/348 712/227 |
| 2004/0153807 A1 * | 8/2004 | Watt | G06F 9/4812 714/35 |
| 2004/0181682 A1 * | 9/2004 | Orino | G06F 21/71 726/22 |
| 2004/0250164 A1 * | 12/2004 | Ahmad | G06F 11/364 714/30 |
| 2005/0055594 A1 * | 3/2005 | Doering | G06F 1/12 713/375 |
| 2005/0097553 A1 * | 5/2005 | Smith | G06F 9/4887 718/100 |
| 2005/0155026 A1 * | 7/2005 | DeWitt, Jr. | G06F 8/443 717/158 |
| 2005/0177819 A1 * | 8/2005 | Ober | G06F 9/3824 717/128 |
| 2005/0182912 A1 * | 8/2005 | DeMent | G06F 12/109 711/206 |
| 2005/0210454 A1 * | 9/2005 | DeWitt, Jr. | G06F 11/3409 717/133 |
| 2005/0289514 A1 * | 12/2005 | Hooper | G06F 11/3664 717/124 |
| 2006/0005179 A1 * | 1/2006 | Kawahara | G06F 8/45 717/157 |
| 2006/0005194 A1 * | 1/2006 | Kawahara | G06F 8/456 718/100 |
| 2006/0117316 A1 * | 6/2006 | Cismas | G06F 9/3851 718/103 |
| 2006/0143390 A1 * | 6/2006 | Kottapalli | G06F 12/084 711/130 |
| 2006/0168583 A1 * | 7/2006 | Basso | G06F 9/3802 718/102 |
| 2006/0212243 A1 * | 9/2006 | Levine | G06F 11/3466 702/79 |
| 2006/0212244 A1 * | 9/2006 | Levine | G06F 11/3466 702/79 |
| 2006/0212687 A1 * | 9/2006 | Chen | G06F 9/3012 712/228 |
| 2006/0212853 A1 * | 9/2006 | Sutardja | G06F 9/4881 717/131 |
| 2006/0242627 A1 | 10/2006 | Wygodny et al. | |
| 2006/0245239 A1 | 11/2006 | Sumita | |
| 2006/0259824 A1 * | 11/2006 | Sohm | G06F 11/323 714/38.13 |
| 2007/0006165 A1 | 1/2007 | Lam et al. | |
| 2007/0043531 A1 * | 2/2007 | Kosche | G06F 11/3447 702/182 |
| 2007/0168968 A1 | 7/2007 | Bates et al. | |
| 2007/0204137 A1 * | 8/2007 | Tran | G06F 9/30181 712/214 |
| 2007/0226545 A1 * | 9/2007 | Chen | G06F 11/3636 714/45 |
| 2008/0065810 A1 * | 3/2008 | Spanel | G06F 11/348 711/3 |
| 2008/0082893 A1 * | 4/2008 | Wang | G06F 11/1008 714/758 |
| 2008/0098207 A1 | 4/2008 | Reid et al. | |
| 2008/0115113 A1 * | 5/2008 | Codrescu | G06F 9/3005 717/127 |
| 2008/0115115 A1 * | 5/2008 | Codrescu | G06F 9/3005 717/128 |
| 2008/0148240 A1 * | 6/2008 | Jones | G06F 11/3612 717/130 |
| 2008/0177756 A1 * | 7/2008 | Kosche | G06F 11/3447 |
| 2008/0256339 A1 * | 10/2008 | Xu | G06F 9/3808 712/216 |
| 2008/0256396 A1 * | 10/2008 | Giannini | G06F 11/3636 714/45 |

(56) References Cited

U.S. PATENT DOCUMENTS

| | | | |
|---|---|---|---|
| 2009/0049429 A1 | 2/2009 | Greifeneder et al. | |
| 2009/0164729 A1* | 6/2009 | Robinson | G06F 12/0875 711/125 |
| 2009/0183167 A1* | 7/2009 | Kupferschmidt | G06F 9/5027 718/104 |
| 2009/0313507 A1* | 12/2009 | Swaine | G06F 11/348 714/38.1 |
| 2010/0100708 A1* | 4/2010 | Ukai | G06F 9/3851 712/205 |
| 2010/0299668 A1* | 11/2010 | Venkumahanti | G06F 11/3632 718/102 |
| 2011/0067015 A1* | 3/2011 | Takagi | G06F 8/456 717/149 |
| 2011/0078406 A1* | 3/2011 | Nickolls | G06F 12/109 711/202 |
| 2011/0078689 A1* | 3/2011 | Shebanow | G06F 12/0284 718/102 |
| 2011/0167243 A1* | 7/2011 | Yip | G06F 9/30141 712/207 |
| 2011/0264959 A1 | 10/2011 | Subhraveti | |
| 2012/0017123 A1* | 1/2012 | Masser | G06F 11/3466 714/45 |
| 2012/0054722 A1* | 3/2012 | Takeda | G06F 8/314 717/128 |
| 2012/0246654 A1* | 9/2012 | Eichenberger | G06F 9/5066 718/102 |
| 2013/0074042 A1 | 3/2013 | Engelbeck et al. | |
| 2013/0191684 A1* | 7/2013 | Busaba | G06F 11/1497 714/10 |
| 2013/0212438 A1* | 8/2013 | Moyer | G06F 11/3636 714/38.1 |
| 2013/0238938 A1* | 9/2013 | Baliga | G06F 11/3632 714/38.1 |
| 2013/0268715 A1* | 10/2013 | Fetterman | G06F 9/3887 711/5 |
| 2014/0019803 A1* | 1/2014 | Busaba | G06F 11/1438 714/16 |
| 2014/0052930 A1* | 2/2014 | Gulati | G06F 11/22 711/141 |
| 2014/0244986 A1* | 8/2014 | Balasundaram | G06F 11/3636 712/233 |
| 2014/0351568 A1* | 11/2014 | Wang | G06F 9/3867 712/239 |
| 2014/0365753 A1* | 12/2014 | Hooker | G06F 9/30058 712/239 |
| 2015/0100834 A1* | 4/2015 | Chamberlain | G06F 11/3471 714/45 |
| 2015/0143343 A1 | 5/2015 | Weiss et al. | |
| 2015/0161030 A1* | 6/2015 | Wu | G06F 8/70 717/127 |
| 2015/0220346 A1* | 8/2015 | Wang | G06F 9/3826 712/208 |
| 2015/0220347 A1* | 8/2015 | Glossner | G06F 9/3851 712/215 |
| 2015/0355996 A1* | 12/2015 | Smith | G06F 11/3636 717/128 |
| 2016/0179166 A1* | 6/2016 | Kurts | G06F 1/3206 713/323 |

OTHER PUBLICATIONS

Jonas Trumper et al., Understanding complex multithread sotware systems by using trace visualization, Oct. 25-26, 2010, [Retrieved on Oct. 27, 2017]. Retrieved from the internet: <URL: https://dl.acm.org/citation.cfm?id=1879232> 10 Pages (133-142).*

Eisen et al., "Instruction Stream Tracing of Multi-Threaded Processors", U.S. Appl. No. 14/982,051, filed Dec. 29, 2015, pp. 1-22.

IBM Appendix P, list of patents and patent applications to be treated as related, Dec. 29, 2015, pp. 1-2.

IBM et al., "Implementing a CSR-PCS as Multiple Threads", An IP.com Prior Art Database Technical Disclosure, Dec. 1, 1993, TDB v336 n 12 12-93 p. 57-62, IP.com No. IPCOM000106627D. IP.com Electronics Publication: Mar. 21, 2005.

Rounce et al., "Dynamic Instruction Scheduling in a Trace-based Multi-threaded Architecture", Int J Parallel Prog (2008) 36:184-205, DOI 10.1007/s10766-007-0062-1, © Springer Science+Business Media, LLC.

SPI DST et al., "An Archi~cec~cura! Trail to Threaded-Code Systems", An IP.com Prior Art Database Technical Disclosure, Mar. 1, 1982, IEEE Computer vol. 15 No. 3, pp. 22-34, IP.com No. IPCOM000131477D. IP.com Electronic Publication: Nov. 11, 2005.

Narayanasamy et al., "BugNet: Continuously Recording Program Execution for Deterministic Replay Debugging", Department of Computer Science and Engineering University of California, San Diego, Proceedings of the 32nd International Symposium on Computer Architecture (ISCA'05), © 2005 IEEE, 12 pages.

Trumper et al., "Understanding Complex Multithreaded Software Systems by Using Trace Visualization", SOFTVIS'10, Oct. 25-26, 2010, Salt Lake City, Utah, USA, Copyright 2010 ACM 978-1-4503-0028-5/10/10, 10 pages.

Upton et al., "Enabling Efficient Online Profiling of Homogeneous and Heterogeneous Multicore Systems", printed on Oct. 11, 2016, 1 page abstract, <http://citeseerx.ist.psu.edu/viewdoc/summary?doi=10.1.1.225.3837>.

* cited by examiner

| 310a | Thread 0 Region 322a | | | | |
|---|---|---|---|---|---|
| Flip Bit | Instruction Info | Register Info | Execution Unit(s) | Program Counter | Prev Thread 410f |
| 1 | Load '0' R1 | 6 | LSU4 | 0 | X |
| 1 | Load '1' R2 | 3 | LSU2 | 1 | 1 |
| 1 | Add R2 to R1 | 3,6 | ALU3 | 2 | 0 |
| 1 | Store R1 @ 'Sum' | 6 | LSU2 | 3 | 0 |
| 0 | - | - | - | - | - |

420

| 310a | Thread 1 Region 322b | | | | |
|---|---|---|---|---|---|
| Flip Bit | Instruction Info | Register Info | Execution Unit(s) | Program Counter | Prev Thread 410f |
| 1 | Add R2 to R1 | 2,1 | ALU3 | 2 | 2 |
| 1 | Store R1 @ 'Sum' | 1 | LSU2 | 3 | 1 |
| 0 | - | - | - | - | - |
| 0 | Load '0' R1 | 1 | LSU4 | 0 | 0 |
| 0 | Load '2' R2 | 2 | LSU2 | 1 | 0 |

420

| 310a | Thread 2 Region 322c | | | | |
|---|---|---|---|---|---|
| Flip Bit | Instruction Info | Register Info | Execution Unit(s) | Program Counter | Prev Thread 410f |
| 0 | - | - | - | - | - |
| 0 | - | - | - | - | - |
| 0 | Load '0' R1 | 4 | LSU4 | 0 | 1 |
| 0 | Load '3' R2 | 5 | LSU2 | 1 | 2 |
| 1 | - | - | - | - | - |

420

| Last Thread Register 310f |
|---|
| 1 |

FIG. 4a 440                                                                                              410f

| Thread | Flip Bit | Instruction Info | Register Info | Execution Unit(s) | Program Counter | Prev Thread |
|---|---|---|---|---|---|---|
| 0 | 1 | Load '0' R1 | 6 | LSU4 | 0 | X |
| 1 | 0 | Load '0' R1 | 1 | LSU4 | 0 | 0 |
| 0 | 1 | Load '1' R2 | 3 | LSU2 | 1 | 1 |
| 0 | 1 | Add R2 to R1 | 3,6 | ALU3 | 2 | 0 |
| 0 | 1 | Store R1 @ 'Sum' | 6 | LSU2 | 3 | 0 |
| 1 | 0 | Load '2' R2 | 2 | LSU2 | 1 | 0 |
| 2 | 0 | Load '0' R1 | 4 | LSU4 | 0 | 1 |
| 2 | 0 | Load '3' R2 | 5 | LSU2 | 1 | 2 |
| 1 | 1 | Add R2 to R1 | 2,1 | ALU3 | 2 | 2 |
| 1 | 1 | Store R1 @ 'Sum' | 1 | LSU2 | 3 | 1 |

| 310a | 310b | 310c | 310d | 310e | 310f |
|---|---|---|---|---|---|
| Flip Bit | Instruction Info | Register Info | Execution Unit(s) | Program Counter | Last Thread Register |
| 1 | Thread 1 Region 322b | | | | |
| | Pre-trigger Wrapping Region For Thread 1 510b | | | | |
| 0 | Thread 1 Region 322b | | | | |

FIG. 5

INSTRUCTION STREAM TRACING OF MULTI-THREADED PROCESSORS

BACKGROUND OF THE INVENTION

The present invention relates generally to the field of analyzing and debugging computing systems, and more particularly to tracing instructions for multi-threaded processors.

In software engineering, instruction tracing is often used to record information about a program's execution. The recorded information may be used by programmers for debugging and performance analysis purposes, and additionally, by system administrators or technical support personnel.

SUMMARY

A method and apparatus for tracing instruction streams for a multi-threaded processor are disclosed herein. In one embodiment, the apparatus includes a last thread register configured to store a thread index that indicates a last executed thread, a tracing memory configured to store, within each of a plurality of storage locations, state information corresponding to a dispatch cycle for a multi-threaded processor, and a tracing control module configured to provide the state information to the tracing memory. The state information may include instruction information and a previous thread index. The state information may also include a flip bit that indicates a current insertion point within the tracing memory. A corresponding method is also disclosed herein.

BRIEF DESCRIPTION OF THE DRAWINGS

FIG. 4a is a block diagram showing specific aspects of the operation of one embodiment of the instruction tracing apparatus of FIG. 3;

FIG. 4b is a table showing one example of reconstructed state information in accordance with the present invention; and FIG. 5 is a block diagram showing specific aspects of one example of the operation of one embodiment of a tracing memory in accordance with the present invention.

DETAILED DESCRIPTION

Multi-threading is a technique to share the execution resources of a single processor (i.e., CPU) amongst multiple programs. The embodiments disclosed herein enable instruction tracing and analysis in multi-threaded processing systems.

Figure 1:
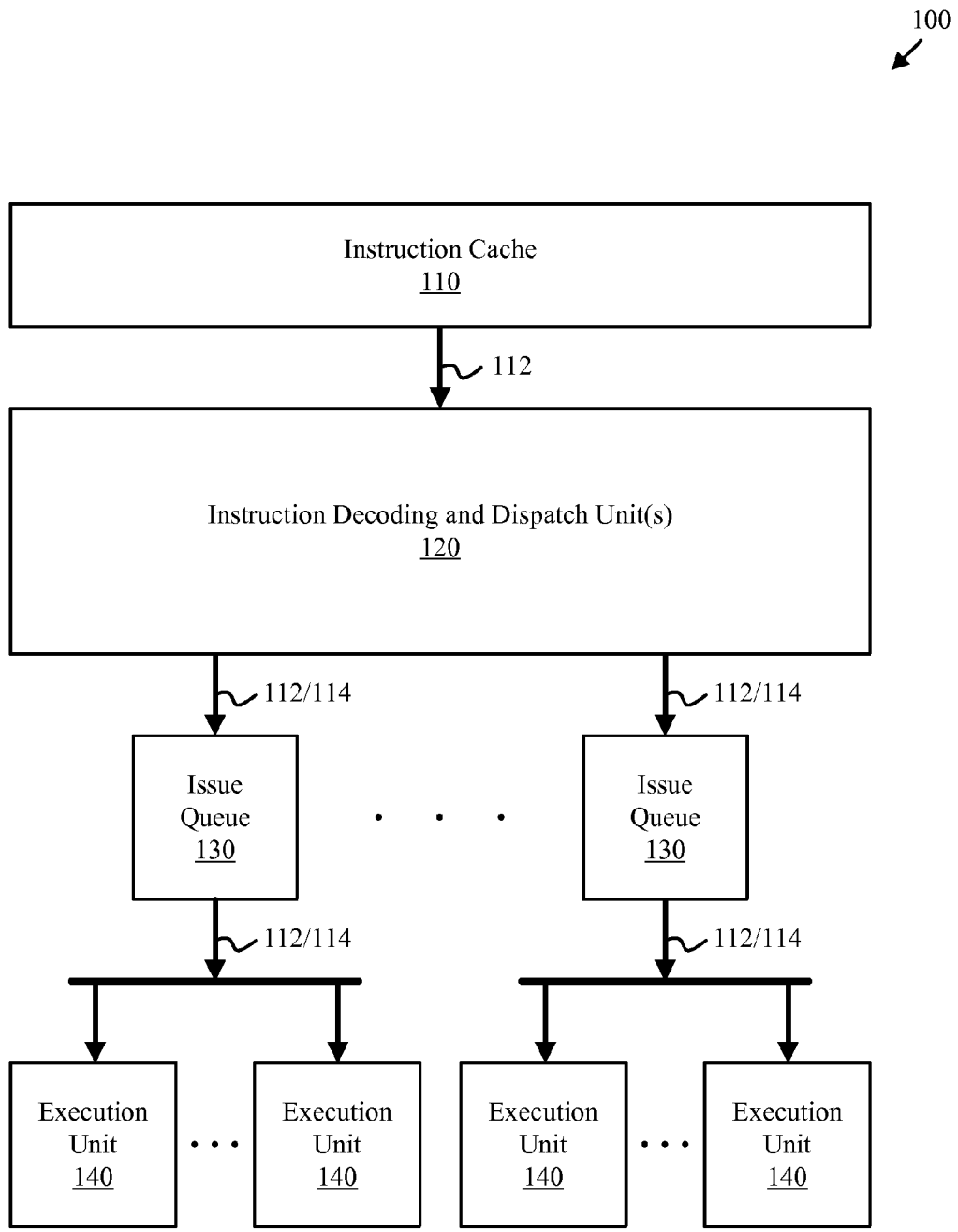
FIG. 1 is a block diagram depicting selected portions of one example of a multi-threaded processing system in which at least some of the embodiments disclosed herein may be deployed.

For example, FIG. 1 is a block diagram depicting selected portions of one example of a multi-threaded processing system 100 in which at least some of the embodiments disclosed herein may be deployed. As depicted, the multi-threaded processing system 100 includes an instruction cache 110, one or more instruction decoding and dispatch units 120, one or more issue queues 130, and one or more execution units 140. The processing system 100 may include other elements needed for executing computer instructions that are omitted for the sake of simplicity. Furthermore, the complexity of the depicted elements is generally omitted for the sake of simplicity.

The instruction cache 110 stores processing instructions that can be processed by the instruction decoding and dispatch units 120. In some embodiments, the instruction cache 110 stores one or more cache lines. In one embodiment, each cache line stores 256 bytes of contiguous instructions.

One or more program counters (not shown) may provide an address to the instruction cache 110 indicting the current index of an executed program within memory. In response thereto, the instruction cache 110 may immediately, or after retrieving a page or line of instructions from main memory, provide one or more program instructions 112 to the instruction decoding and dispatch units 120.

The instruction decoding and dispatch units 120 may parse the program instructions 112 and dispatch each program instruction 112 to an execution unit 140 via an issue queue 130. In some embodiments, each issue queue 130 provides instructions to a distinct set of execution units 140. In some embodiments, each program instruction 112 is converted to one or more microcode instructions 114 which are dispatched to an execution unit 140 via the issue queue 130. In some embodiments, multiple instructions 112 or 114 are dispatched during each dispatch/processing cycle to improve throughput. In some embodiments, the instructions 112 or 114 are parsed into groups that do not span a branch instruction and tagged with a group identifier.

The multi-threaded processing system 100 may switch execution between multiple active programs and/or multiple active processes within a program. When one program or process is stalled, for example when a page of instructions or data must be retrieved from non-cache memory, another program or process may be executed by the system 100. Consequently, the system 100 and the executions units 140 need not be idle. Such a utilization approach may be referred to as multi-threaded processing. In some embodiments, multiple active programs or processes (i.e., threads) are time multiplexed (e.g., interleaved) onto the available issue queues 130 (rather than waiting for a program or process to stall) such that a set of execution units 140 associated with an issue queue 130 repeatedly executes instructions from multiple threads.

In addition to multi-threading capabilities, the multi-threaded processing system 100 may also have multi-processing capabilities. For example, each issue queue 130 may be associated with a dedicated set of execution units 140 that may operate independently of other sets of executions units 140. For example, each issue queue 130 may be associated with a particular region of allocated memory that cannot be accessed by instructions in the other issue queues 130. Such a configuration is sometimes referred to as a processing side or a processing slice. In one embodiment, multiple issue queues 130 are provided with a triplet of up to three instructions 112 or 114 and each issue queue 130 provides the triplet to a separate set of executions units 140 that correspond to a distinct processor. In some embodiments, the execution units 140 include one or more virtual branch units that are fed by an issue queue 130 that only accepts branching instructions.

One challenge for the multi-threaded processing system 100 and similar systems is debugging and analysis. Traditional instruction tracing approaches result either in a single instruction stream that is difficult to separate into distinct threads or multiple thread-specific instruction streams where timing information and cross-thread dependencies (e.g., sequences) are lost. The embodiments disclosed herein address this issue and other issues.

Figure 2:
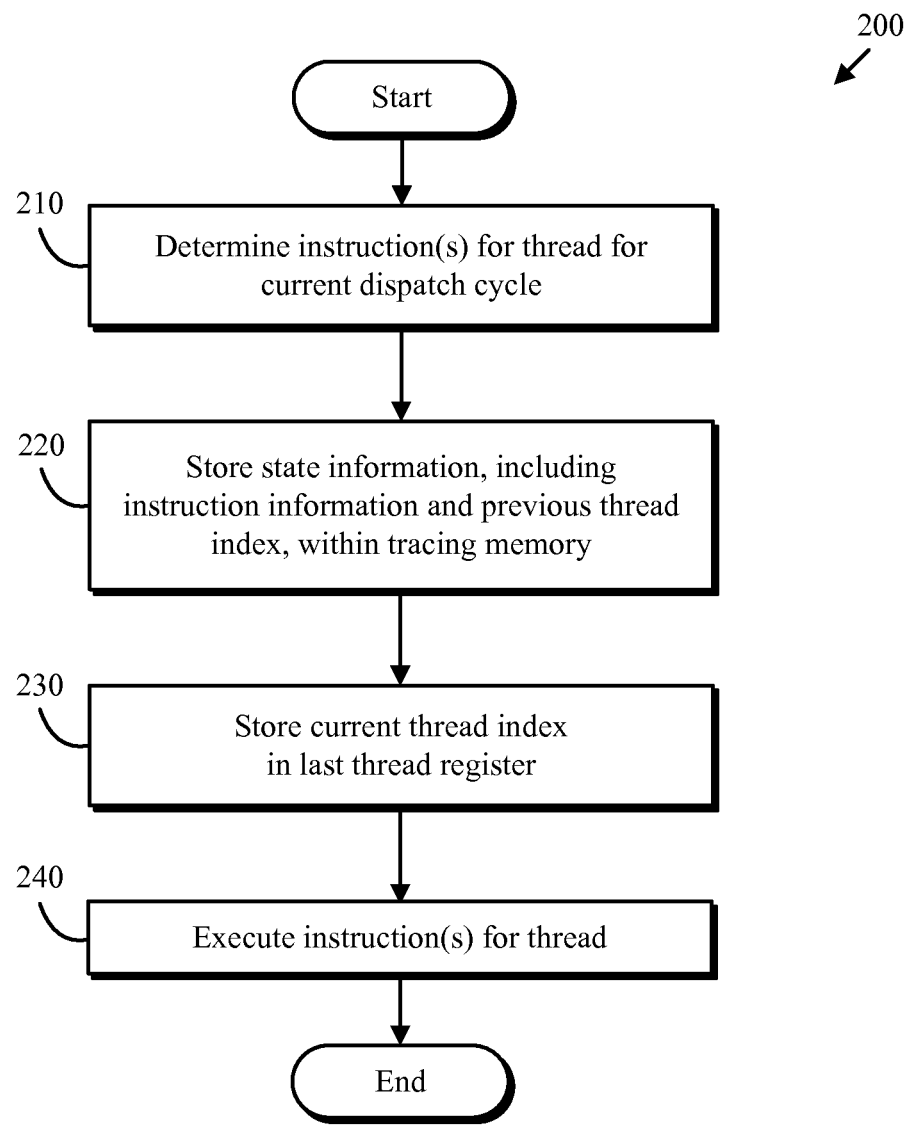
FIG. 2 is a flowchart depicting one embodiment of an instruction tracing method in accordance with the present invention.

FIG. 2 is a flowchart depicting one embodiment of an instruction tracing method 200 in accordance with the present invention. As depicted, the instruction tracing method 200 includes determining (210) one or more instructions for a thread, storing (220) state information within a tracing memory, storing (230) a current thread index, and executing (240) the instructions for the thread. The instruction tracing method 200 captures state information for threads in a multi-threaded processing system or environment in a manner that enables reconstructing state information for each particular thread or the processing system as a whole.

Determining (210) one or more instructions for a thread may include determining one or more instructions that belong to the same thread. In some embodiments, the instructions are dispatchable during the same dispatch cycle.

Storing (220) state information within a tracing memory may include storing information that indicates the state of a processor or processing system such as instruction information, register information, execution unit information, program counter information, instruction group information, pipeline information, and the like. In some embodiments, the state information includes a last thread index that indicates which thread was executed in the previous dispatch cycle.

Storing (230) a current thread index may include storing the current thread index in a register for use as the previous thread index during the next dispatch cycle. Executing (240) the instructions for the thread may include executing the instructions referred to in the state information.

Figure 3:
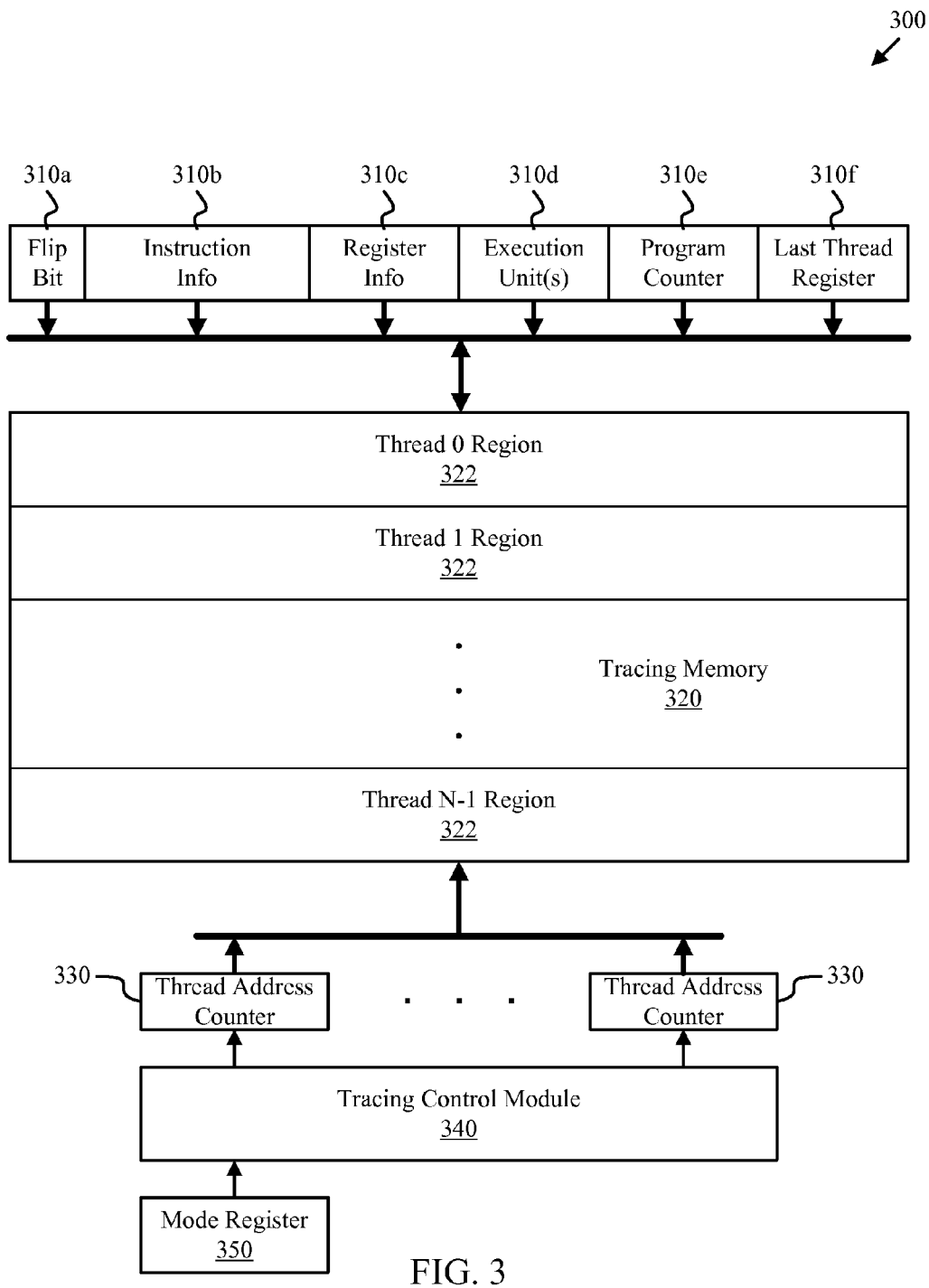
FIG. 3 is a block diagram depicting one embodiment of an instruction tracing apparatus in accordance with the present invention.

FIG. 3 is a block diagram depicting one embodiment of an instruction tracing apparatus 300 in accordance with the present invention. As depicted, the instruction tracing apparatus 300 includes a set of state registers 310 (i.e., 310a-f), a tracing memory 320, a set of thread address counters 330, and a tracing control module 340. The instruction tracing apparatus 300 enables the capture of state information for threads in a multi-threaded processing system or environment. For example, the instruction tracing apparatus 300 could be used to capture the instructions 112 and/or 114 shown in FIG. 1 (and related information not shown in FIG. 1) at an appropriate location such as at the input of the issue queue(s) 130. Examples of related information include program counter information, execution unit identifiers, register identifiers, group identifiers, and pipeline identifiers.

The depicted state registers 310 include a 'flip bit' register 310a, an instruction information register 310b, a register information register 310c, an execution unit information register 310d, a program counter register 310e, and a last thread register 310f. In addition to the above registers, other registers corresponding to other relevant state information may also be included.

The 'flip bit' register 310a may store a 'flip bit' that is used to indicate that a memory location within the tracing memory has been updated. In one embodiment, the value of the 'flip bit' is toggled (i.e., flipped) when the end of a tracing region 322 is reached and subsequent writes are made at the beginning of the tracing region.

The instruction information register 310b contains information regarding the instructions 112 and/or 114. In some embodiments, the instruction information is a code or an index that can be used to derive the actual instructions. In other embodiments, the instruction information is one or more actual instructions. For example, the instruction information may specify one or more operation codes or micro-operation codes. The codes may correspond to a group of instructions that are dispatched together (e.g., in the same dispatch cycle) and tracked via a group identifier.

The register information register 310c may indicate which registers are involved in the instructions. In one embodiment, a virtual register system is used and the register information register 310c indicates the actual physical registers that are assigned to the current instructions. The execution unit information register 310d may indicate which execution units 140 have been assigned to (the instructions executed during) the current dispatch cycle.

The program counter register 310e may contain at least a portion of the program counter for the current thread. The last thread register 310f may indicate the thread involved in the previous dispatch cycle (i.e., a last thread index).

The tracing memory 320 may be a memory array or a set of registers. The thread address counters 330 (i.e., tracing memory address counters 330) may be used to index the tracing memory 320. In some embodiments, the tracing memory 320 is partitioned into thread regions (or partitions) 322 and a particular thread address counter 330 is assigned to each thread region 322. A particular thread address counter 330 may be advanced when state information for the corresponding thread is written to the corresponding thread region 322 with the tracing memory 320. Partitioning the tracing memory into thread regions in such a manner ensures that state information is retained for each thread including stalled or hung threads.

In certain embodiments, selected bits of the thread address counter 330 (e.g., the high order bits) are fixed so that the thread address counter 330 can only access the corresponding thread region 322. In other embodiments, the tracing memory 320 is not partitioned into thread regions 322 and a single address counter 330 is used to write state information to the (entire) tracing memory 330 from multiple (intermixed) threads. Using the entire tracing memory 330 to capture state information from multiple intermixed threads ensures that the most recent state information for the processing system 100 is captured.

The tracing control module 340 may coordinate the movement of information into the state registers 310. The tracing control module 340 may also control advancement of the thread address counters 330 and the movement of information to and from the tracing memory 320. In one embodiment, toggling between an un-partitioned tracing memory 320 and a tracing memory 320 that is partitioned into thread regions 322 is controlled by a configuration or mode register 350 that is read by the tracing control module 340. Consequently, in such an embodiment, the operation mode of the instruction tracing apparatus 300 may be user selectable including partitioning of the tracing memory 320 into thread regions 322.

FIG. 4a is block diagram showing specific aspects of one example of the operation of one embodiment of the instruction tracing apparatus 300. In the depicted example, thread regions 322a, 322b, and 322c record state information for a thread 0, a thread 1, and a thread 2, respectively. In the depicted example each of the threads is executing substantially the same program albeit with a different value in register 'R2'. The state information recorded within the thread regions 322 include register information which indicates that actual physical register involved with each instruction. For example, physical registers 3 and 6 are associated with thread 0, physical registers 1 and 2 are associated with thread 1, and physical registers 4 and 5 are associated with thread 2.

In addition to the register information, the depicted example shows the execution units associated with each instruction as well as a previous thread index 410f. In this example, the previous thread index 410f could be provided to the tracing memory 320 by that the last thread register 310f. The previous thread index 410f, along with the contents of the last thread register 310f, can be used to determine an execution sequence 420 for the traced instructions. In the depicted example, the execution sequence 420 is shown in reverse order starting with the last executed instruction.

One of skill in the art will appreciate that a transition in the 'flip bit' 310a corresponds to the current insertion point for each thread region 322. Therefore, the state information preceding the transition in the 'flip bit' 310a corresponds to the most recent instruction executed by the thread. Furthermore, the 'flip bit' 310a can be used to determine last executed instruction for the thread. Consequently, the execution history of the thread can be recreated from the information within the corresponding thread region 322.

One of skill in the art will also appreciate that the execution history of the system 100 as a whole can be reconstructed by using the previous thread index to construct the execution sequence 420 and then retrieving the contents of the tracing memory 320 according to the execution sequence 420. For example, FIG. 4b is table showing one example of reconstructed state information 430 in accordance with the present invention. In addition to the state information stored in the tracing memory 320 (see previous Figures) such as the previous thread index 410f, the reconstructed state information 430 may include a current thread index 440. Consequently, the state information for the entire system 100 may be reconstructed and viewed as a whole. In some embodiments, such a reconstruction includes state information for multiple issue queues 130 within each row of the table.

FIG. 5 is block diagram showing specific aspects of one example of the operation of one embodiment of the tracing memory 320 in accordance with the present invention. In the depicted example, a thread region 322 (322b in this case) may be used to record the state information provided by the state registers 310 (i.e., 310a-310f). A pre-trigger wrapping region 510 (510b in this case) may be used to repetitively record state information previous to a triggering event.

In response to the triggering event, the thread address counter for the thread (not shown) may be advanced so that subsequent writes to the thread region 322 start after the end of the pre-trigger wrapping region 510b. Consequently, pre-trigger state information for a particular thread can be captured within the pre-trigger wrapping region 510b without (potentially) overwriting all of the memory within the thread region 322 allocated to the thread. When reconstructing the state information stored within the thread region 322, the 'flip bit' information provided by the flip bit register 310a may be referenced to know the last memory location within the pre-trigger wrapping region 510b that was written to previous to the triggering event.

It should be noted that the apparatuses disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for real-time tracing of instruction streams for a multi-threaded processor, the method comprising:
   providing a multi-threaded processor comprising a tracing memory, a last thread register, and a tracing memory address counter configured to provide an address to the tracing memory;
   storing, within the last thread register for each dispatch cycle of the multi-threaded processor, a current thread index for use as a last executed thread index during a next dispatch cycle;
   storing, within a tracing memory at a location indicated by the tracing memory address counter for each dispatch cycle of the multi-threaded processor, state information corresponding to a current thread, wherein the current thread corresponds to one or more instructions that are dispatched for the current thread by a dispatch unit during that dispatch cycle of the multi-threaded processor;
   wherein the state information comprises the last executed thread index provided by the last thread register and instruction information corresponding to the one or more instructions that are dispatched for the current thread by the dispatch unit during that dispatch cycle; and
   wherein storing the state information including the last executed thread index occurs in real-time concurrent with instruction execution in the multi-threaded processor to enable reconstruction of thread sequencing.

2. The method of claim 1, wherein the state information comprises a flip bit that is used to determine a current insertion point within the tracing memory.

3. The method of claim 1, further comprising reconstructing state information for one or more threads from the state information within the tracing memory.

4. The method of claim 1, wherein the instruction information corresponds to a group of instructions dispatched in the same cycle.

5. The method of claim 1, wherein the instruction information indicates an operation code.

6. The method of claim 5, wherein the operation code corresponds to one or more micro-operations.

7. The method of claim 1, wherein the state information comprises one or more of program counter information, an execution unit identifier, a register identifier, a group identifier, and a pipeline identifier.

8. The method of claim 1, wherein the tracing memory is partitioned into a plurality of partitions and wherein each partition of the plurality of partitions corresponds to a particular thread.

9. The method of claim 8, wherein the tracing memory is selectively partitioned into the plurality of partitions.

10. An apparatus for real-time tracing of instruction streams for a multi-threaded processor, the apparatus comprising:
   a last thread register configured to store for each dispatch cycle of the multi-threaded processor, a current thread index for use as a last executed thread index during a next dispatch cycle;
   a tracing memory address counter configured to provide an address to the tracing memory for each dispatch cycle of the multi-threaded processor;
   a tracing memory configured to store, for each dispatch cycle of the multi-threaded processor, within a storage location indicated by the tracing memory address counter, state information corresponding to a current thread, wherein the current thread corresponds to one or more instructions that are dispatched for the current thread by a dispatch unit during that dispatch cycle for the multi-threaded processor;
   a tracing control module configured to provide the state information to the tracing memory;
   wherein the state information comprises the last executed thread index provided by the last thread register and instruction information corresponding to the one or more instructions that are dispatched for the current thread by the dispatch unit; and
   wherein the state information including the last executed thread index is stored in the tracing memory in real-time concurrent with instruction execution in the multi-threaded processor to enable reconstruction of thread sequencing.

11. The apparatus of claim 10, wherein the state information comprises a flip bit that is used to determine a current insertion point within the tracing memory.

12. The apparatus of claim 10, wherein the state information comprises instruction information.

13. The apparatus of claim 12, wherein the instruction information corresponds to a group of instructions dispatched in the same cycle.

14. The apparatus of claim 12, wherein the instruction information indicates an operation code.

15. The apparatus of claim 14, wherein the operation code corresponds to one or more micro-operations.

16. The apparatus of claim 10, wherein the state information comprises one or more of program counter information, an execution unit identifier, a register identifier, a group identifier, and a pipeline identifier.

17. The apparatus of claim 10, wherein the tracing memory is partitioned into a plurality of partitions and wherein each partition of the plurality of partitions corresponds to a particular thread.

18. The apparatus of claim 17, wherein the tracing control module is configured to selectively partition the tracing memory into the plurality of partitions.

19. The apparatus of claim 10, further comprising at least one additional tracing memory address counter configured to provide an address to the tracing memory.

* * * * *